G. P. THOMAS.
MULTIPLE PUNCHING MACHINE.
APPLICATION FILED DEC. 5, 1912.

1,141,221.

Patented June 1, 1915.
7 SHEETS—SHEET 1.

WITNESSES:

INVENTOR

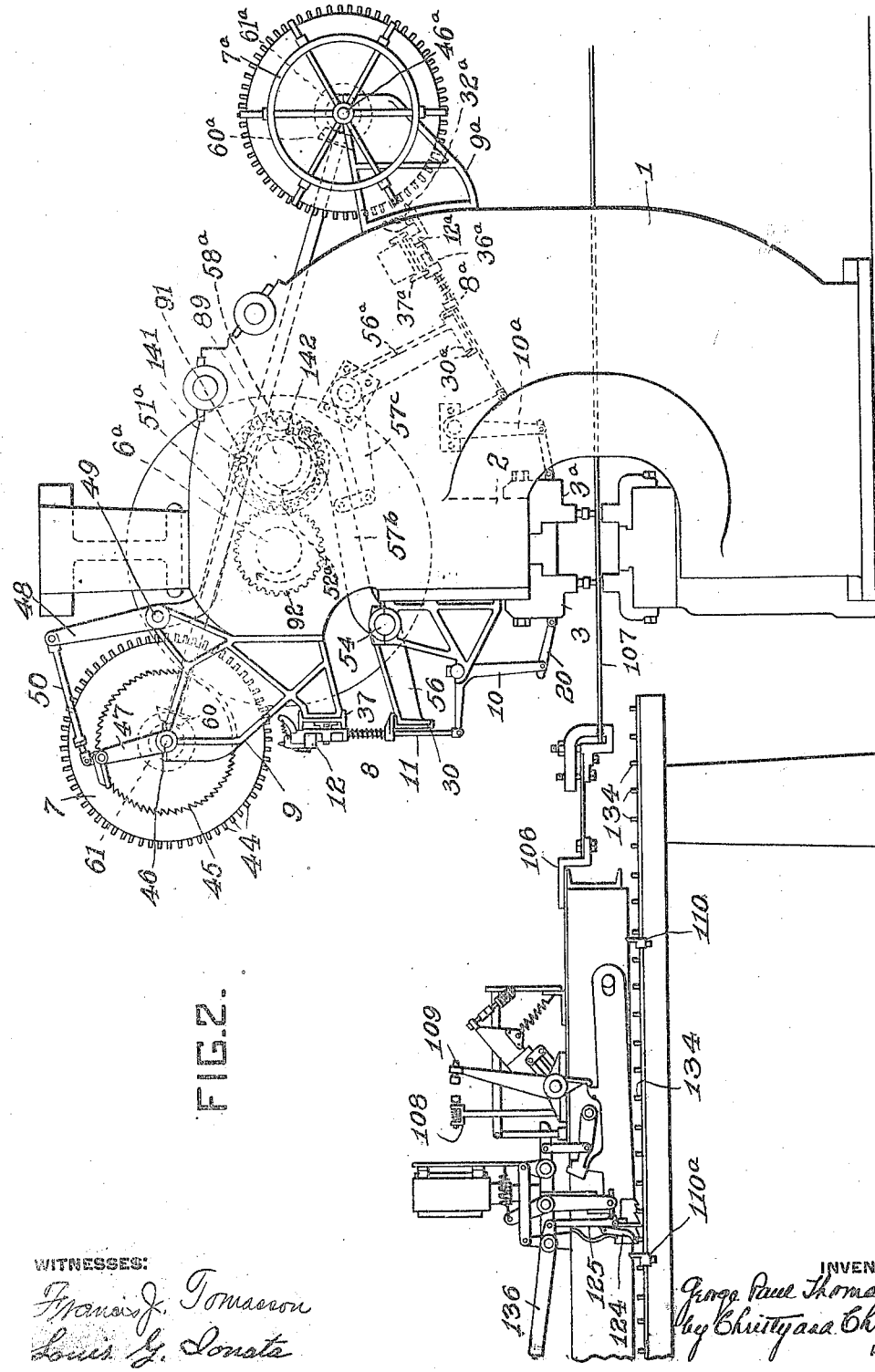

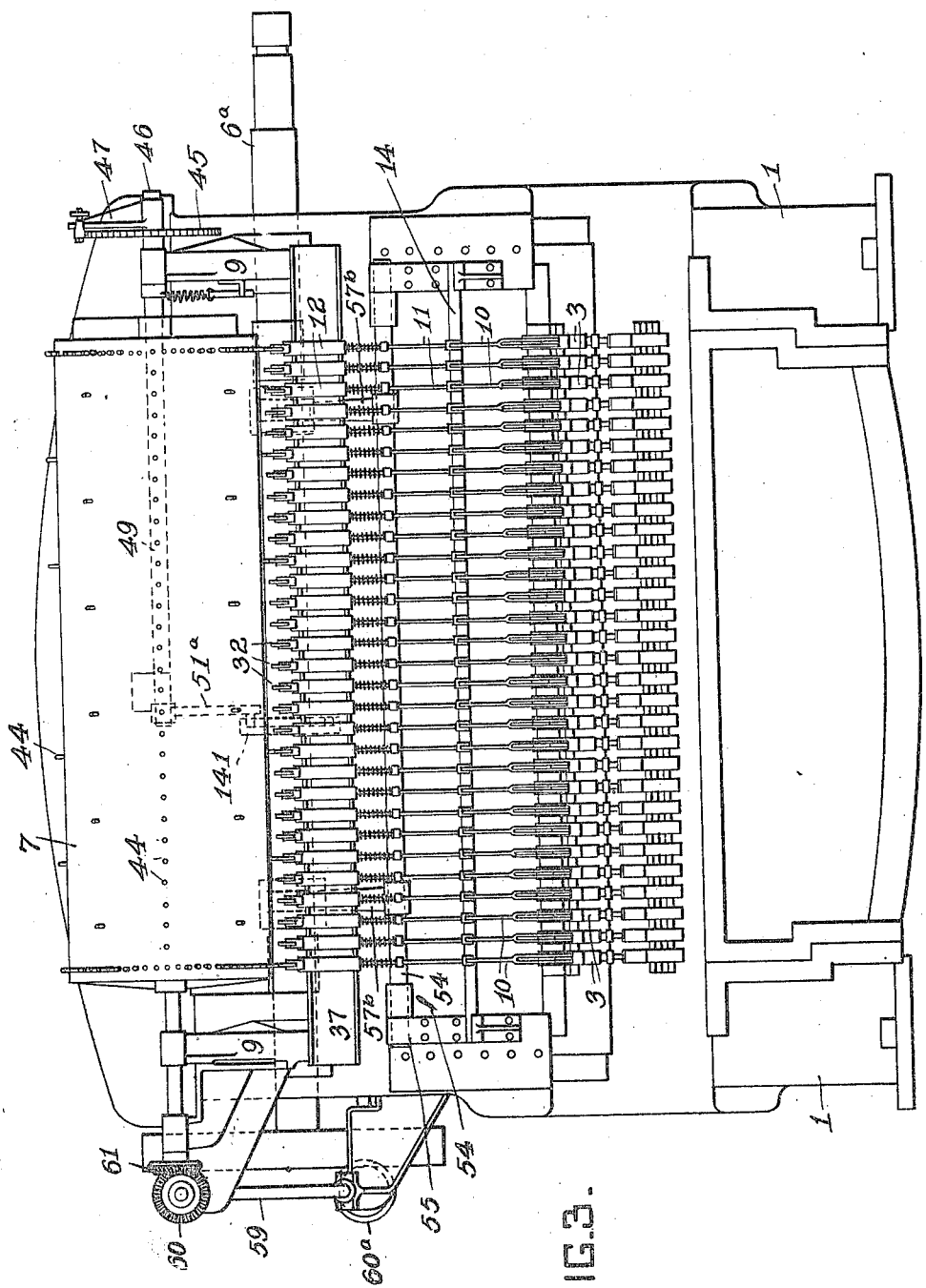

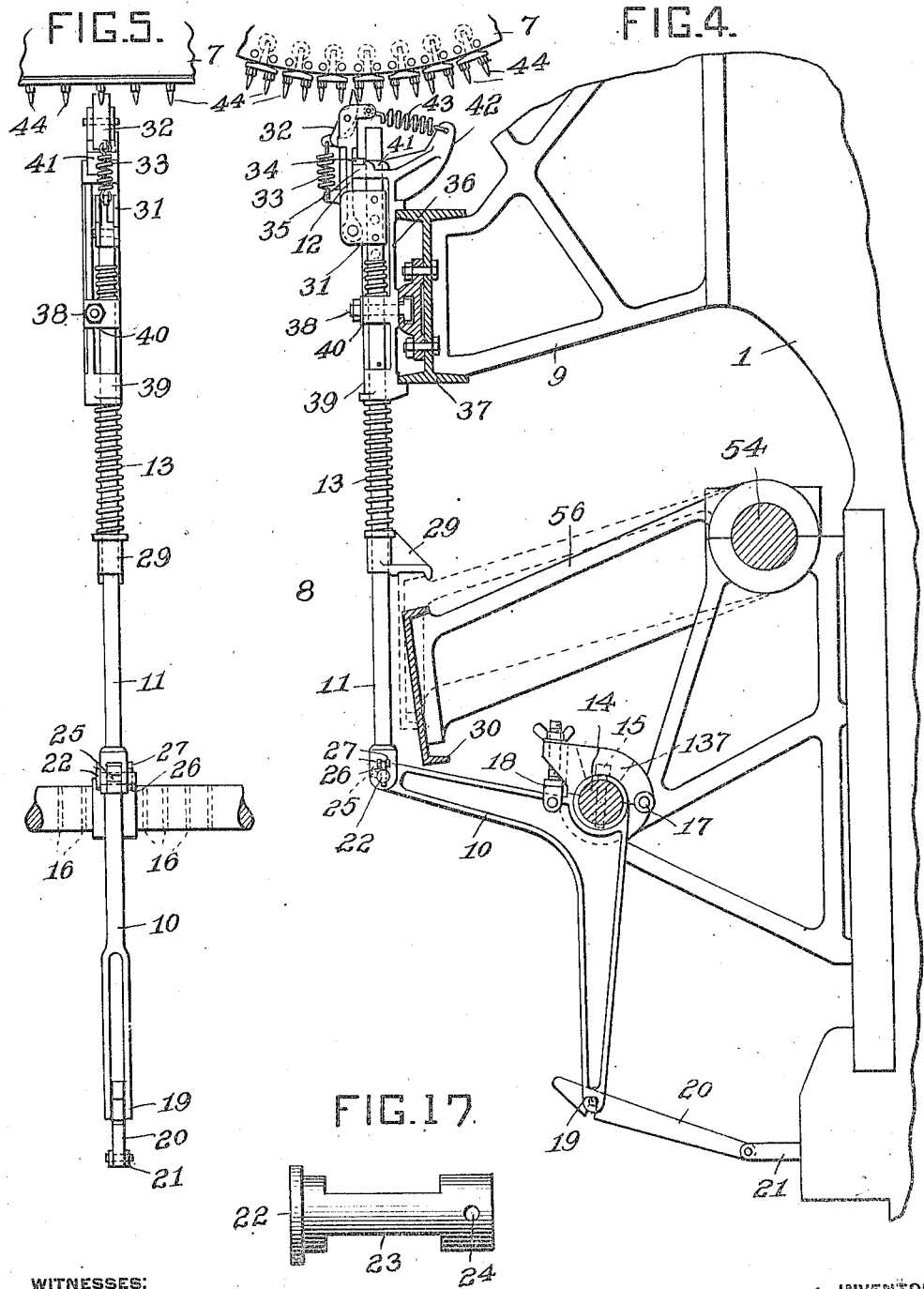

G. P. THOMAS.
MULTIPLE PUNCHING MACHINE.
APPLICATION FILED DEC. 5, 1912.

1,141,221.

Patented June 1, 1915.
7 SHEETS—SHEET 5.

WITNESSES:
Francis J. Tomasson
Louis G. Ionata

INVENTOR
George Paul Thomas
by Christy and Christy
Att'ys

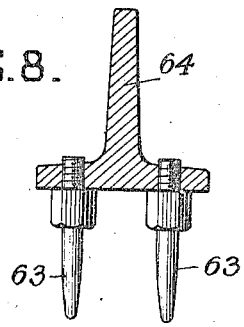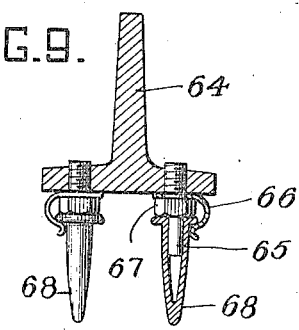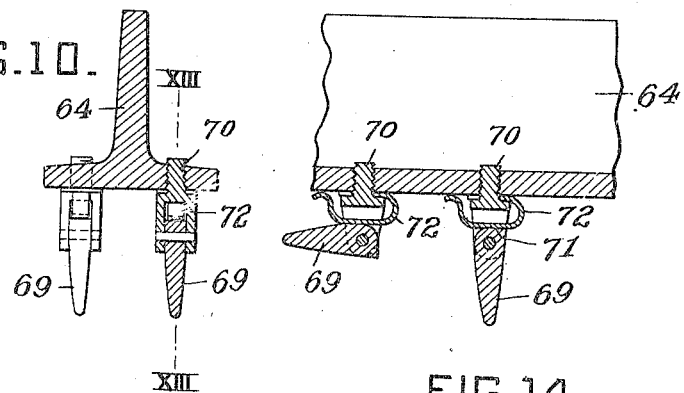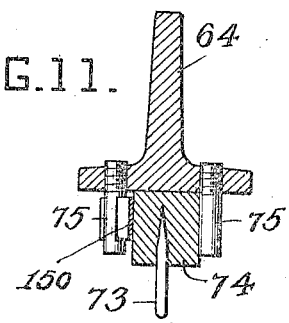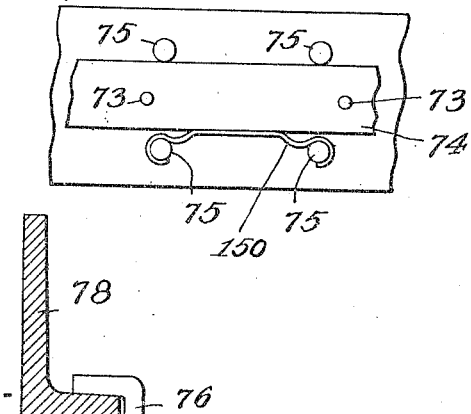

G. P. THOMAS.
MULTIPLE PUNCHING MACHINE.
APPLICATION FILED DEC. 5, 1912.
1,141,221.
Patented June 1, 1915.
7 SHEETS—SHEET 7.
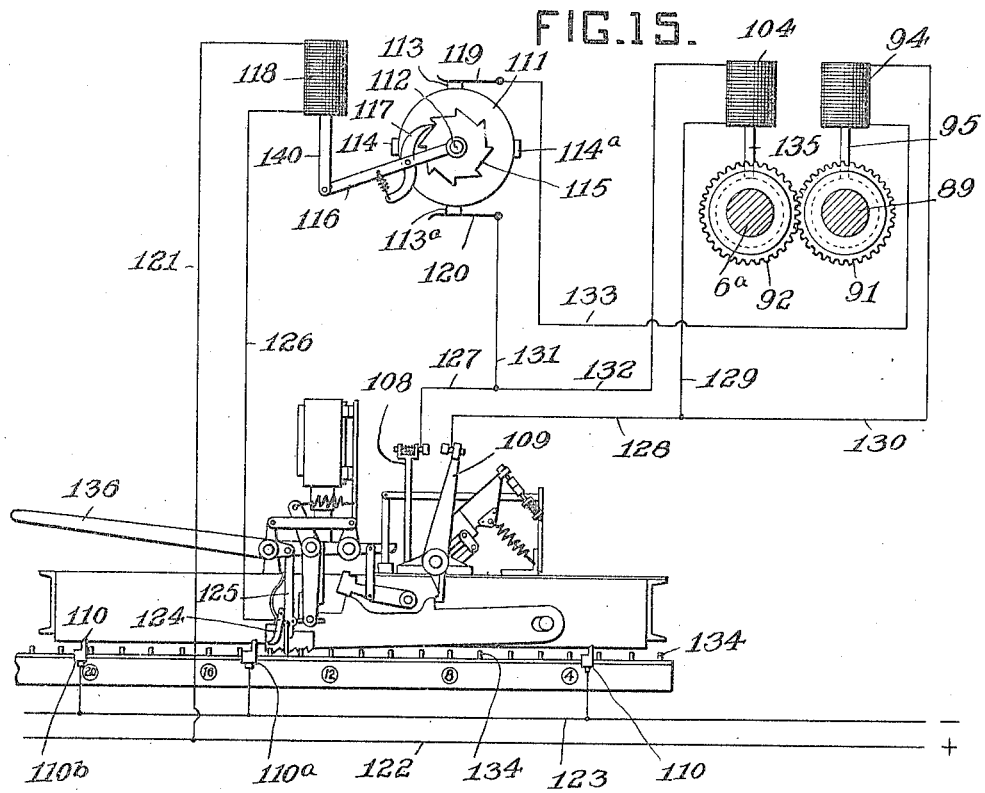
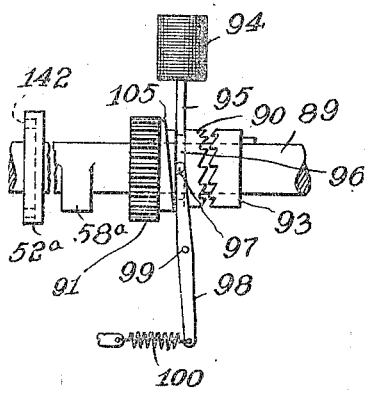
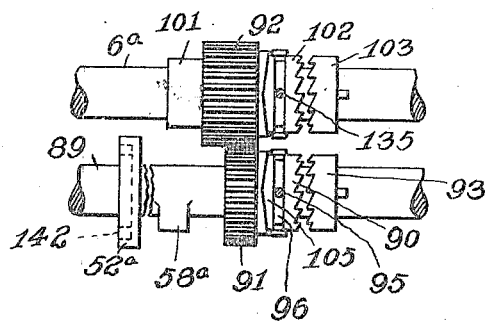

UNITED STATES PATENT OFFICE.

GEORGE PAUL THOMAS, OF GLENSHAW, PENNSYLVANIA.

MULTIPLE PUNCHING-MACHINE.

1,141,221. Specification of Letters Patent. Patented June 1, 1915.

Application filed December 5, 1912. Serial No. 735,123.

*To all whom it may concern:*

Be it known that I, GEORGE PAUL THOMAS, residing at Glenshaw, in the county of Allegheny and State of Pennsylvania, a citizen of the United States, have invented or discovered certain new and useful Improvements in Multiple Punching-Machines, of which improvement the following is a specification.

The invention described herein relates to machines for punching material, such as structural steel angles, plates, beams, etc., and has to do particularly with multiple punching machines provided with punch-selecting mechanism, which, as the machine operates upon a blank of material, bring the desired punches into action for each punching stroke.

The object of the invention is to provide a machine for the purpose and of the character described, which will be simple and practical in its construction, and which will be positive and efficient in its operation.

A further object of my invention is to facilitate the setting up or adjustment of such machines for different arrangements of spacing.

The accompanying drawings, which form part of the specification, illustrate the preferred embodiment of the machine as well as some alternate forms in the details of its construction.

Figure 1:
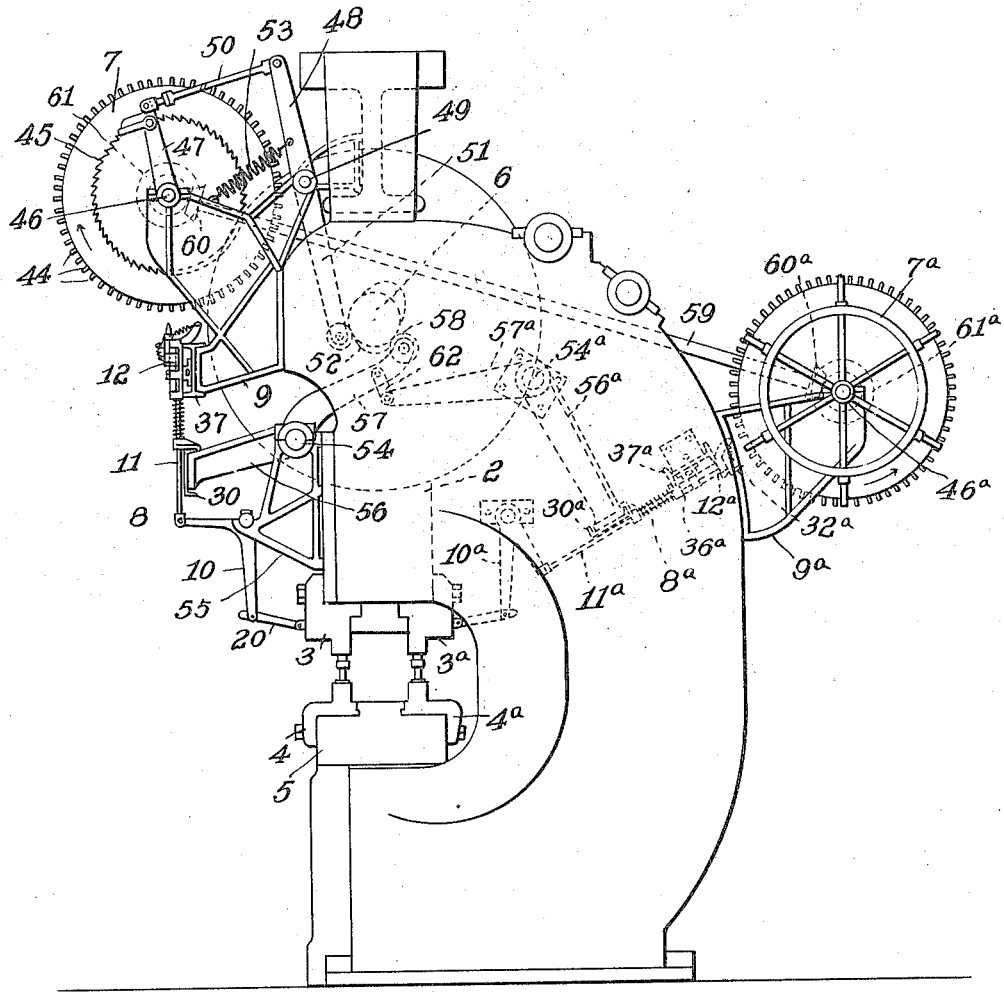
Figure 6:
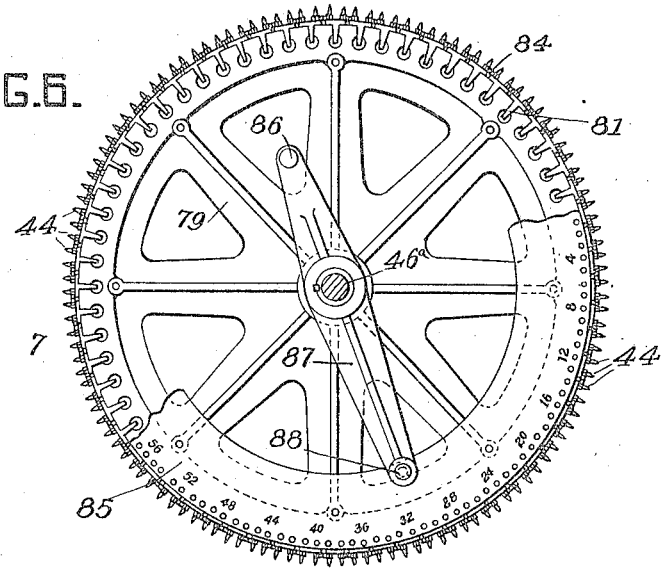
Figure 7:
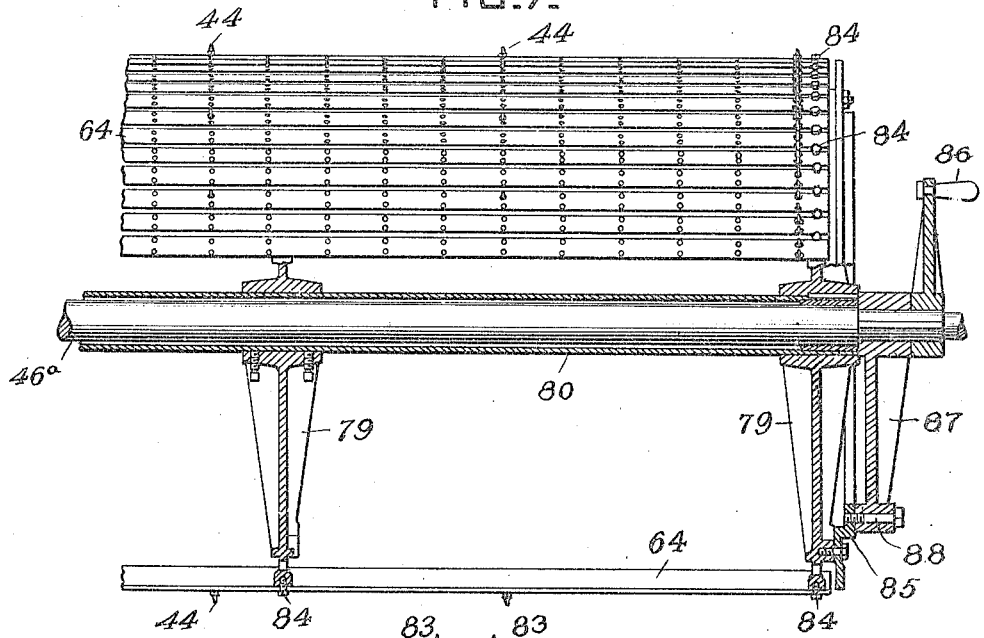
Figure 18:
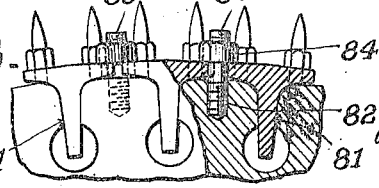

Figure 1 of the drawings is an end view of a multiple punch and punch selector mechanism, wherein the punch selectors are operated at each reciprocation of the punching head; Fig. 2 is an end view of a similar punch and punch selector mechanism, together with a spacing table, the operation of the punch selector mechanism with relation to the reciprocation of the punching head being controlled by the advance of the spacing carriage; Fig. 3 is a left side or front view of the punch and selector mechanism shown in Figs. 1 and 2, the driving mechanism for the gag controls in this figure being that illustrated in Fig. 2 rather than that illustrated in Fig. 1; Figs. 4 and 5 are side and end elevations to an enlarged scale of a single punch selecting gun; Fig. 6 is an enlarged end view of the templet cylinder; Fig. 7 is a side view, partly in longitudinal section, of the templet cylinder shown in Fig. 6; Figs. 8, 9, 10, 11, and 12 are enlarged detail views of various forms of adjustable or removable templet pins; Fig. 13 is a sectional view taken on the lines XIII, XIII, Fig. 10; Fig. 14 is a bottom plan view of the templet pins shown in Fig. 11; Fig. 15 is a diagrammatic view of the wiring system employed in the form of machine shown in Fig. 2, such diagram being shown in connection with a spacing table, electric switch, and controlling clutches; Fig. 16 is a detail view of one of the clutches shown in Fig. 15; Fig. 17 is a detail view of a connecting pin; Fig. 18 is a detail view of a portion of the templet; Fig. 19 is a plan view of the clutches.

In the several figures like numerals are used to designate like parts, and like numerals are used with letter exponents to designate parts, which, in the various modifications of my invention, have like functions.

In the practice of my invention in its preferred form I employ a reciprocating-head multiple punch, of the type now generally used in all structural steel shops, the head being provided with a plurality of laterally adjustable gag punches; and, coordinated with the punch head driving mechanism, I provide means for controlling the gags of the several punches. A spacing table, with a movable carriage, is employed in connection with the punch to bring a blank of material which is being punched to the desired successive positions beneath the punches; and said table and carriage are provided with means for controlling said gag-controlling means, whereby the desired arrangements of active punches may be effected upon each reciprocation of the punching head, or whereby the gag controlling mechanism may be rendered inactive while a number of punching operations are effected, wherein the same arrangement of active punches is required for each operation or stroke of the punching head.

In Fig. 1 (and partly in Fig. 2) of the drawings I have illustrated an embodiment of certain features of my invention, wherein the spacing table and carriage are not provided with means for controlling the gag-controlling means, but wherein the desired arrangement of acting punches is made upon each reciprocation of the punching head. Referring first to this embodiment of my invention, the punch frame work 1 is provided with a reciprocating head 2, which in turn has a plurality of laterally adjustable and separately removable punch holders 3 and 3ᵃ secured to it in two lines. Coöperating with the punch holders there are two lines of die holders 4 and 4ᵃ, mounted on the anvil 5 of the frame 1, which holders are also laterally adjustable and separately removable. The punch and die holders are of the character shown and described in my Letters Patent No. 1,064,397, and need not be further described herein. The head 2 is caused to reciprocate in the usual manner by means of a rotatable shaft 6, driven by any suitable source of power, but preferably through a clutch mechanism as will be hereinafter described.

Each line of punch holders 3, 3ᵃ is provided with punch controlling mechanism, or punch selectors, consisting of a templet and guns, which, as in the case of the punch and die holders, are also laterally adjustable and separately removable. The templet 7 and the guns 8 control or bring into operative position the gags of the punches 3, while the templet 7ᵃ with the guns 8ᵃ control the punches 3ᵃ, there being suitable means provided to move the templet and to reset or release the gags, as will be described hereafter. The templets 7, 7ᵃ are cylindrical in form, are rotatably supported by suitable brackets 9, 9ᵃ secured to the punch frame 1, and are provided with suitably arranged fingers, which trip the desired guns and bring the punches into operation.

Referring now more particularly to the detail construction of the several elements described above, each gun 8, one of which is illustrated to enlarged scale in Figs. 4 and 5, consists of a bell crank lever 10, and a vertically movable rod 11 held normally in raised position by a pivoted trip finger 12 against the resistance of a spring 13. It will be seen, however, that the gun illustrated in Figs. 4 and 5 is in raised position, whereas the gun in Fig. 1 is in lowered or tripped position. The said bell-crank levers are rotatably mounted upon a rod or shaft 14, and are held at the desired position on such shaft by means of pins 15 dropping through slots 137 into holes 16 provided at small intervals in the shaft 14 for the purpose; and, in order to facilitate the removal of said bell crank lever from the shaft 14, the bearing portion of said lever is in two parts, hinged as at 17, and held in closed position by means of a hinged clamping screw 18. The downwardly-extending arm of said lever 10 is slotted (see Fig. 5) and is provided with a pin 19, over which the link 20 hooks, such link being pivotally connected to a gag 21. The outwardly-extending arm of said lever is pivotally connected to the rod 11; and, in order to facilitate the assembling of this connection a knuckle-joint is used, wherein a pivot pin 22 is provided with a flattened central portion 23, as shown particularly in Fig. 17, and with a cotter-pin hole 24, the end of the lever arm 10 having a slot 25 adapted to receive the flattened portion 23 of said pin, and having at the inner end of said slot 25 a cylindrical hole of slightly larger diameter than the pin 22. In connecting the rod 11 to the lever 10, the pin 22 is first inserted in the rod 11, and is held with its flattened sides 23 parallel to the longitudinal extent of the rod by means of a cotter 26 inserted in the hole 24, the head of said cotter being held between lugs 27 projecting from the side of the rod 11. The rod is then held parallel to the outwardly extending lever arm so that the flattened portion 23 of the pin 22 will enter the slot 25 at the end of such arm, after which the rod is turned to its operative vertical position, the pin 22 being rotatably held in the cylindrical hole at the end of the slot 25. The rod 11 is provided also with a lug 29 which is rigidly secured thereto and is adapted to be engaged by a releasing bar 30. A second lug 31 is attached to the rod near the end thereof, and the trip finger 12 is in turn pivoted to said lug. The said finger 12 is preferably a two-part finger, there being a supplementary finger 32 pivoted to the upper end of said finger 12, and so arranged that when the templet is moved from right to left (as seen in Fig. 4) the entire finger 12, 32 will be moved when engaged by a templet projection; but, when the templet is moved in the opposite direction, the finger 32 will yield against the action of the spring 33 when engaged by a templet projection. The finger 12 is also provided with a shoulder 34 adapted to rest upon a ledge 35 of a frame 36, which frame is removably and adjustably secured to a beam 37 supported by the supplementary punch frame 9. As shown herein, the frame 36 is secured to said beam 37 by a single bolt 38, the head of which is engaged by a slot enlarged interiorly. The frame 36 also has three sleeves 39, 40 and 41 through which the rod 11 may move, and an arm 42 is formed on the end of the frame, to which arm a spring 43 is attached, said spring being connected at its other end to the finger 12. It will be observed of the gun construction just described that each gun may easily be removed in two parts, by removing the nut on bolt 38 and by releasing the clamping screw 18. Also, each gun may be adjusted laterally by loosening the nut on said bolt 38 and by removing the pin 15. The guns 8ᵃ are similar in construction to the guns 8, and are briefly described hereinafter.

As stated above, the templets 7 and 7ᵃ are effective to trip such guns as are necessary in order to bring desired punches into operation. To such an end the cylindrical face of the templet is provided with fingers 44 arranged so as to lie in circumferential lines as well as in longitudinal lines upon such face, the fingers 44 which lie in each circumferential line being adapted to trip the trip-finger 12, 32 of a single gun at desired times, as the punching operation progresses. The longitudinal arrangement of the fingers 44 upon the templet is for the purpose of tripping simultaneously the desired guns for each stroke of the punch. The templet 7 is advanced to bring successive longitudinal lines of fingers 44 into gun-tripping position by means of a pawl and ratchet mechanism operated by cams mounted on the main punch driving shaft 6. A ratchet wheel 45 is rigidly secured to the shaft 46 of said templet, such shaft being rotatably mounted in suitable bearings in the supplementary frame 9; and a pawl-provided arm 47 is rotatably mounted on said shaft 46, said pawl being adapted to engage the teeth on said ratchet wheel. An arm 48 is keyed to a shaft 49, which is rotatably mounted in the frames 9, said arm 48 being connected to the arm 47 by a link or rod 50. A second arm 51 is also keyed to the shaft 49, and is provided with a roller adapted to bear upon a cam 52, secured to the shaft 6 preferably near the central portion thereof, such bearing being effected by the action of a spring 53 connected to the arm 48 and frame 9 as shown. The form of the cam 52, as well as its position upon the shaft 6, is such that the templet 7 is rotated a predetermined amount between each stroke of the punching head, the amount of rotation being (when measured on the face of the templet) the distance between successive longitudinal lines of fingers 44. This intermittent advance of the templet is effected, as will be understood, through cam 52, arm 51, shaft 49, arm 48, link 50, pawl-arm 47, and ratchet wheel 45.

In order to raise the guns after each punching operation, and thereby withdraw the gags from operative positions, a releasing mechanism is provided, similar in its general construction to the above described templet-moving mechanism. A shaft 54 is rotatably mounted in suitable frames 55, and arms 56, carrying the above mentioned releasing bar 30, are keyed to such shaft. Another arm 57 is also keyed to the shaft 54 on one end, and is provided at its opposite end with a roller adapted to bear upon a cam 58 secured to the central portion of the shaft 6. The form of the cam 58 and its position upon the shaft 6 are, as in the case of the templet-moving mechanism, such that the releasing bar rises between each punching operation.

The arrangement of the parts now described in detail, and the timing of their operation, is preferably as follows: As the punch head rises the cam 58 causes, through arm 57, shaft 54 and arm 56, the releasing bar 30 to rise, and in rising such bar engages the lugs 29 of such guns 8 as have been previously tripped, and raises them until the shoulders 34 of the fingers 12, 32 snap over the ledge 35. The further rotation of the shaft 6 then becomes effective, as described above, to move the templet 7 so that the next longitudinal line of fingers 44 trip the desired gun fingers 12, 32, it being understood that, while the templet 7 is advancing, the bar 30 is being lowered to the full line position indicated in Fig. 4. In this tripping action the fingers 12, 32 are moved to the left so that their shoulders 34 no longer rest upon the ledge 35. The released rods 11 then move downwardly under the action of the springs 13, and the bell crank levers 10 thrust into operative position the gags connected to the tripped guns. Following upon this operation the punch head descends and punches the material beneath it.

The detailed explanation of my punching machine has been concerned thus far only with the description of the coöperating templet 7, guns 8 and punches 3. The templet $7^a$, which is substantially the same as templet 7, is effective to control, through guns $8^a$, the operation of the punches $3^a$. The templet $7^a$ may be driven simultaneously with the templet 7 by means of a rod 59 provided at its ends with bevel gears, 60 and $60^a$ which mesh with corresponding gears 61 and $61^a$ keyed to the shafts 46 and $46^a$ of the templets 7 and $7^a$, respectively. The guns $8^a$ are constructed substantially the same as the guns 8, and each consists of a bell crank lever $10^a$, a rod $11^a$ and a trip finger $12^a$, $32^a$. Also the frames $36^a$ of the guns $8^a$ are secured to the beam $37^a$. The releasing mechanism for the guns $8^a$ is operated by, and simultaneously with, the releasing mechanism of the guns 8, and consists of a shaft $54^a$, arms $56^a$ keyed to said shafts $54^a$ and supporting a releasing bar $30^a$, and an arm $57^a$ also keyed to the shaft $54^a$ and connected to the arm 57 by means of a link 62.

The preferred general construction of the templets 7 and $7^a$ is illustrated to enlarged scale in Figs. 6, 7 and 18; and in Figs. 8 to 12 inclusive I have illustrated various forms of templet fingers. As far as the mounting of the templets upon their shafts is concerned, Figs. 6 and 7 show only the mounting of the templet $7^a$.

In order to obtain rigidity in structure, accuracy in the location of the templet trip fingers, and lightness in weight, I form the templet surface of a plurality of separately removable longitudinal elements consisting of T's 64. Such T's may be supported by wheels 79, keyed to a sleeve 80. In the templet 7 the sleeve 80 is keyed to the shaft 46, and in the templet $7^a$ the sleeve 80 is loosely mounted upon the shaft $46^a$, the reason for such mounting appearing hereafter. The connection of the T's 64 to the wheels 79 is illustrated to enlarged scale in Fig. 18. The periphery of each wheel 79 is accurately divided into equal spaces, and slots 81 are milled radially into the periphery, the said slots being of the proper size to receive the leg of the T's 64. The periphery of each wheel is also provided with screw threaded holes 82, spaced half way between the slots 81, and adapted to receive threaded pins 83 upon which nuts 84 are screwed to hold the T's in place.

As explained heretofore the shaft 46 is advanced intermittently by the pawl-provided arm 47 secured to said shaft. This movement of the shaft is directly transmitted to the templet 7, the sleeve 80 of which is keyed to the shaft 46. However, in the case of the templet 7ª, rotary movement is imparted thereto through an arm 87 which is keyed to the shaft 46ª. The end of the arm 87 is connected to the templet 7ª by means of a pin 88, which is secured to a plate 85 attached to the end wheel 79 for the purpose of such connection. This indirect connection of the templet 7ª to the shaft 46ª is made in order to set the templet 7 and 7ª in such accurate relative positions that their respective longitudinal lines of fingers will trip the guns 8 and 8ª at exactly the same time. In assembling the machine the hole in the plate 85, in which hole the pin 88 is inserted, is drilled after all the machine parts have been accurately positioned.

In order to move the templet 7 and 7ª without the aid of the reciprocating head 2, a hand lever 86 may be keyed to the shaft 46ª. It will be seen that a reverse movement of the templets may be effected by suitably lifting the pawl on the pawl-arm 47 and turning the hand lever 86. Such movement of the templets may be advantageously employed between the punching of successive pieces of material when only a portion of the surface of the templet is set up with the desired arrangement of fingers 44.

Any desired form of fingers 44 may be secured to the face of the templet, it being understood however that it is desirable to employ fingers which may be easily adjusted to various positions upon the face of the templet depending upon the required spacing of the holes to be punched in the blank. The fingers illustrated in Fig. 8 are screw-threaded pins 63, the surface of the templet (in this instance the T's 64) being provided with a plurality of screw-threaded holes. In order to reset or adjust the pins 63, it is necessary to unscrew each pin from one hole and screw it into another hole. In the construction of Fig. 9 each of the plurality of holes in the T's 64 is provided with a short pin 65, and a spring 66 is clamped between the face of the T and a shoulder 67 on said pin. The trip fingers proper consist of thimbles 68 adapted to be slipped upon the ends of the short pins 65 and held thereon by the springs 66. Such thimbles may be easily and quickly removed from one pin and placed upon another when it becomes desirable to reset the templet. In the construction of Figs. 10 and 13 the tripping fingers 69 are hinged to pins 70, which are secured to the face of the templet. The hinged end of said pins 69 are provided with flat surfaces 71 against which springs 72 bear to hold said fingers in outward position. Also, the hinge axes of said fingers are at right angles to the axis of rotation of the templet so that the fingers will not swing when they strike the guns. It will be readily understood that the fingers 69, when inoperative, lie in a general horizontal position, as indicated in Fig. 13. In Figs. 11 and 14 the tripping fingers are pins or headless nails 73 driven into strips of wood 74 at the proper intervals to accomplish the desired tripping of guns for a single stroke of the punch. The strips of wood may be held upon the templet by means of pins 75 and springs 150, as shown in Fig. 14. It will be understood that the pins 73 in each strip 74 constitute a single longitudinal line of tripping fingers, and that the face of the templet is provided with as many such strips as there are strokes of the punching head required to punch a given blank of material. In the form of fingers illustrated in Fig. 12, each finger 76 is clamped to any desired position upon the templet by means of set screws 77. For fingers of this type the elements of the templet surface may conveniently be angle irons 78, as shown.

It will be observed of all the forms of fingers, that any finger may be adjusted to any desired position upon the face of the templet, thereby facilitating the setting up of a templet for new or slightly different work.

Having thus described my invention as applied to a machine wherein the desired guns for each punching operation are tripped and released during each operation, I will now describe a modification thereof, wherein a given arrangement of guns, when tripped, will not be released by the same stroke of the punch, but will remain tripped, and hence cause the same arrangement of holes to be punched in the material for any desired number of strokes. To such an end I preferably connect the templet-moving and the releasing-bar operating-cams to a supplementary shaft, which is preferably driven by the main punch-operating shaft through an interposed clutch mechanism, preferably operated by electricity; and I arrange electrical contacts upon the spacing table which become effective at desired intervals to release or bring into operation such clutch. The preferred modification in structure embodying this feature of my invention is illustrated particularly in Figs. 2, 3, 15, 16 and 19. All the parts of the punching machine illustrated in Figs. 2 and 3 are substantially the same as described heretofore and shown in the several figures referred to in such description, with the exception of the mechanism which concerns the above mentioned clutch. The cams 52ª and 58ª are keyed to a supplementary rotatable shaft 89 suitably journaled in the frame 1. A clutch member 90 is loosely mounted upon said shaft 89 and is securely connected to a toothed wheel 91, which meshes with a similar wheel 92 of the same diameter mounted on the punch-operating shaft 6ª. A second clutch member 93 is keyed to the shaft 89. The position of the loosely mounted clutch member 90 upon the shaft 89 is controlled by a solenoid 94, of which the core 95 lies in an annular groove 96 when said solenoid is inactive. A suitable shoulder 97 engages said groove and is connected to one end of a lever 98, pivoted as at 99, and having its opposite end connected to a spring 100. When an electric circuit is completed through the solenoid 94, the core 95 rises and the spring 100 becomes effective to thrust the clutch member 90 to the right (as seen in Fig. 16) and into engagement with the clutch member 93, so that the shaft 89 and the cams 52ª and 58ª keyed thereto will revolve. Upon the breaking of the circuit through the solenoid coil 94, the core 95 falls into a cam slot 105, and, bearing against the side of said cam slot as it rotates, causes the clutch member 90 to move to the left, thereby breaking engagement with the clutch member 93. The core 95 then continues to lie in the groove 96 until a circuit is again completed through the solenoid coil. The punch operating shaft is also preferably driven through a clutch interposed between the operating motor and said shaft. To such an end the gear wheel 92 is connected to a sleeve 101, which is loosely mounted on the shaft 6ª and which is operatively connected to a motor (not shown). A clutch member 102 is connected to the sleeve 101, and a coöperating clutch member 103 is keyed to the shaft 6ª. The position of the united structure, consisting of the sleeve 101, the wheel 92 and clutch member 102, is controlled by means of a second solenoid 104 in the same manner as the position of the clutch member 90 is controlled. A further structural modification in this form of my invention has to do with the cam 52ª and the arm 51ª. Said arm 51ª, instead of having a roller at its end adapted to bear upon the cam 52ª, is provided with a pin 141 which moves through a slot 142 in said cam. By such a construction the arm 51ª is moved positively, and a spring, such as the spring 53 shown in Fig. 1, is not necessary. As in the machine shown in Fig. 1, the arm 57ᵇ is provided with a roller and the arm 57ᶜ has link connection to the arm 57ᵇ.

The construction of the spacing table and carriage shown herein is for the most part described fully in my Letters Patent No. 1,068,465, and therefore need not be here described. The general arrangement and coordination of the spacing table and punch shown herein, except for the tripping of the guns, is such that the table 106, engaging a blank of material 107 drags such blank beneath the punches and is stopped at desired predetermined intervals. Upon the stopping of the table a circuit is closed through the solenoid 104 and the punching head operates. The releasing of the carriage effects a breaking of the circuit through said solenoid 104 and the carriage advances to the next stopping point. As described in my said application, the punch controlling circuit is completed through contacts carried on the arms 108 and 109 of the spacing table.

In order to control the operation of the templet so that guns will not be tripped and released when the arrangement of holes desired for a number of successive punching operations is the same, I mount a series of electrical contact-blocks 110, 110ª, 110ᵇ, etc., upon the spacing table at such intervals as it is desirable to stop the regular intermittent advance of the templet, and at points where it is desirable to start said intermittent advance of the templet after said templet has been inoperative for a number of strokes. Such control of the templet I preferably accomplish by means of a movable solenoid-operated switch member 111, together with the solenoid-controlled clutch 90, described above.

The switch member 111 is preferably in the form of a disk keyed to a shaft 112 and provided with two pairs of contactors 113, 113ª and 114, 114ª. Secured to the disk is a ratchet wheel 115 provided with eight teeth; and an arm 116, provided with a pawl 117, is loosely mounted on said shaft 112. The outer end of said arm 116 is connected to the core 140 of a solenoid 118, the arrangement being such that, when a circuit is completed through the solenoid 118, the core 140 will rise, and, through arm 116, pawl 117, and ratchet 115, cause the switch disk 111 to turn one eighth of a revolution. The position of the disk 111 in Fig. 15 is such as to complete a circuit through the contactors 113, and 113ª, and the solenoid, so that a movement of the disk one eighth of a revolution will break the circuit through such solenoid, and a second movement of one eighth revolution will bring the contactors 114, 114ª into contact with the contact members 119 and 120.

A convenient wiring system for the complete operation and control of the punch selector mechanism as well as the punching head is diagrammatically illustrated in Fig. 15. The solenoid 118 is connected by a line 121 to the positive circuit wire 122, and the negative circuit wire 123 is electrically connected to each of the electrical contact blocks 110, 110ª, 110ᵇ, etc. A finger 124 of conducting material is carried by the spacing table arm 125 in a position to contact successively with said blocks 110, and said finger is connected by a line 126 to the solenoid coil 118. The contacts on the spacing table arms 108 and 109 are connected to lines 127 and 128, respectively, the line 128 dividing into two lines 129 and 130 leading to the solenoid cores 104 and 94, respectively; and the line 127 dividing into two lines 131 and 132 leading, respectively, to the switch contact member 120 and the solenoid 104. Also, a line 133 connects the solenoid 94 with the other switch contact member 119.

As the several parts of this controlling mechanism are shown in the drawings, the arrangement is such that the templets 7 and 7ª are advanced, and desired guns are tripped at each stroke of the punching head during such time as the table passes between the contact blocks 110 and 110ª. When the spacing table arm 125 is tripped by any one of the pins 134 lying between said blocks 110 and 110ª, the arm 109 moves into contact with the arm 108 so that a circuit is closed through both solenoids 104 and 94. The circuit through the solenoid 104 flows through lines 128, 129, 132 and 127; and is effective to lift the core 135 of said solenoid so that the clutch member 102 is brought into engagement with its coöperating clutch member 103, and, in consequence thereof, the shaft 6ª is turned and the punching head 2 is reciprocated. The circuit through the solenoid 94 flows through lines 128, 130 and 133, contact members 119, 113, 113ª, and 120, and lines 131 and 127; and is effective to lift the solenoid coil 95, so that the clutch member 90 is brought into engagement with its coöperating clutch member 93 to the end that shaft 89 is rotated and the templets 7 and 7ª advanced. In this wiring arrangement it will be understood that the lines 127 and 128 are suitably connected to feed lines, or sources of electrical supply, not shown herein. After the punching head 2 has effected the desired punching of holes for a single reciprocation thereof, the stopping mechanism of the spacing table is released, as by the hand lever 136, and substantially simultaneously with such release of the carriage the arm 109 breaks contact with the arm 108 so that the circuits through the solenoids 94 and 104 are thrown open.

When the finger 124 strikes the contact block 110ª a circuit is completed through the solenoid 118 and the switch 111 moves one eighth of a revolution, breaking the circuit through the contactors 119 and 120. In this position of the switch each stopping of the carriage will be effective to close a circuit only through solenoid 104, so that the punching head will operate without advancing the templets.

In order to facilitate the setting up of my improved punching machine the longitudinal lines of fingers on the templets may be numbered successively, as shown on Fig. 6, and the stops 134 may be correspondingly numbered.

The operation of each of the several parts of my machine has been described in connection with description of the structure thereof. It will therefore be unnecessary to recite the full operation of the machine.

I do not wish to limit myself to the structural details shown herein for obviously many changes may be made by those skilled in the art without departing from the spirit of my invention as defined in the claims.

I claim herein as my invention:

1. In a punching machine, the combination with a frame, and a reciprocating head; of a plurality of normally inactive punches adjustably carried by said head, a plurality of separately removable punch-selecting guns borne by said frame, and means effective upon the reciprocation of said head to cause said guns to render desired punches active.

2. In a punching machine, the combination with a frame and a reciprocating head; of a plurality of normally inactive punches adjustably borne by said head, a plurality of separately adjustable and separately removable punch selecting guns borne by said frame and connected to said punches, and means operating through said guns for rendering desired punches active.

3. In a punching machine, the combination with a frame and a reciprocating head; of a plurality of normally inactive punches adjustably borne by said head, a plurality of separately adjustable punch selecting guns borne by said frame, and consisting of movable and stationary members, each of said stationary gun members being secured to said punch frame by a single clamping member, and means effective upon the reciprocation of said head for moving said movable gun members.

4. In a punching machine, the combination with a frame and a reciprocating head; of a plurality of normally inactive punches adjustably secured to said head; a plurality of separately adjustable and separately removable punch selecting guns secured to said frame and operatively connected to said punches; each of said guns consisting of a stationary frame, a rod movable through said frame and carrying a trip finger adapted to engage said frame, and a bell crank lever having its arm connected to said rod and to said punches; and means operated in coördination with the reciprocation of said head for tripping said fingers.

5. In a metal-punching machine, the combination of a frame, a reciprocating head mounted therein, a plurality of normally inactive punches adjustably borne by said head, a rotatable cylindrical templet provided with a plurality of adjustable radially extending fingers, a plurality of separately adjustable punch-selecting guns borne by said frame and adapted in alternate position to control the operation of said punches, and means for operating said head and rotating said templet.

6. In a punching machine the combination with a frame, and a punching head; of a plurality of punches secured to said head, a plurality of movable punch selectors effective to control the operation of said punches, a shaft borne by said frame, a cylindrical templet rotatably mounted thereon, means fixed to said shaft for operatively engaging said templet at a plurality of points, and means for revolving said shaft, the rotation of said templet being effective through said punch selectors to bring desired punches into operation.

7. In a metal-punching machine, the combination of a frame, a reciprocating head mounted therein, and a plurality of punches secured to said head; of a rotatably mounted shaft, an annular templet rotatably mounted on said shaft and adapted to control the selection of said punches for operation, a pawl-provided arm secured to said shaft, a ratchet wheel secured to said templet and adapted to be engaged by said pawl-arm, and means for reciprocating said arm.

8. In a metal-punching machine, the combination with a frame, and a reciprocating head mounted therein; of a plurality of punches borne by said head, a plurality of punch selectors adapted in alternate positions to control the operation of said punches, a movable templet provided with means to move said punch selectors, a rotatable shaft provided with means for reciprocating said head, means operated by said rotatable shaft for moving said templet whereby said punch selectors are brought to one position, and means operated by said rotatable shaft for bringing said selectors to their other positions.

9. In a metal-punching machine, the combination with a frame, and a reciprocating head mounted therein, of a plurality of adjustable punches borne by said head, a rotatable cylindrical templet provided on its surface with a plurality of projecting fingers, a plurality of punch selectors held yieldingly in the path of said templet fingers and extending to said punches, a rotatable shaft provided with means for reciprocating said head, a cam mounted on said shaft, means operated by said cam for intermittently advancing said templet, a second cam mounted on said shaft, and means operated by said second cam for moving the punch selectors to templet-engaging positions which selectors upon the advance of the templet had been tripped thereby.

10. In a metal-punching machine, the combination with a frame, and a reciprocating head mounted therein; of a plurality of punches borne by said head, means coordinated with the reciprocation of said head for selecting and bringing predetermined punches into operation, and means for rendering said punch-selecting means ineffective during predetermined punching intervals and while said head continues to reciprocate.

11. In a metal-punching machine, the combination with a frame, and a reciprocating head mounted therein; of a plurality of punches secured to said head, means coordinated with the reciprocation of said head for selecting and bringing predetermined punches into operation, means for moving a blank of material to successive predetermined stopping points to be operated on by said punches, and means for rendering said punch-selecting means ineffective while said blank-moving means carries a blank through a predetermined range of stops and while said head continues to reciprocate.

12. The combination with a punching machine provided with a plurality of punches; of means for selecting and bringing predetermined groups of punches into operation, means for moving a blank of material to successive predetermined stopping points to be operated upon by said punches, a plurality of successively arranged stops effective to control the advance of said blank moving means, said stops being arranged in alternating successive groups, means effective upon the stopping of said blank-moving means at each of the several stops in one of said groups for rendering operative said punch selecting means, and means for rendering said punch selecting means inoperative while said blank-moving means stops at the several stop elements in the next successive group.

13. In a metal-punching machine the combination of a source of power, a reciprocatory punching-head and a rotary templet drum both driven from said source of power and normally coördinated with respect to their several movements, a punch-gag in said punching-head, means controlled by the rotation of said templet drum for shifting said punch-gag, and means for interrupting connection from the said source of power to said templet-drum while connection is maintained from said source of power to said reciprocating head.

14. In a metal-punching machine the combination of a source of power, a reciprocatory punching-head and a rotary templet-drum, both driven from said source of power and normally coördinated with respect to their several movements, a table over which the work passes in its gradual progress through said machine, a punch-gag in said punching-head, means for interrupting connection from said source of power to said templet, drum, and means operated by the advance of the work upon said table controlling said interrupting means.

15. In a metal-punching machine, the combination of a punch including a reciprocatory punching head, a spacing-table including a work-carriage, a source of power, operative connection from said source of power to said reciprocatory head, a movable make-and-break member in such connection, means operated by the movement of said carriage upon the table for moving said make-and-break member, a punch in said reciprocating head provided with a movable gag, means for shifting said gag, a movable member controlling said gag-shifting means, operative connection from a source of power to said movable member, a make-and-break device in the operative connection last named, and means operated by the movement of said carriage upon the table for moving the make-and-break device last named.

16. In a metal-punching machine, the combination of a punching head provided with two sets of punching tools, two sets of movable gags borne by said head and controlling said punching tools, two gag-shifting mechanisms, two movable templets, one controlling each of said gag shifting mechanisms, means for moving one of said templets, and means operated by the last named templet for moving the second templet, said last named means including an adjustable connecting member.

In testimony whereof I have hereunto set my hand.

GEORGE PAUL THOMAS.

Witnesses:
FRANCIS J. TOMASSON,
PAUL N. CRITCHLOW.